United States Patent [19]

Franz

[11] Patent Number: 5,042,318
[45] Date of Patent: Aug. 27, 1991

[54] STEERING WHEEL COVER WITH A KNURLY CONFIGURED GRIPPING SURFACE

[76] Inventor: Eric C. Franz, 15 Cabrillo, Newport Beach, Calif. 92663

[21] Appl. No.: 337,458

[22] Filed: Apr. 13, 1989

[51] Int. Cl.$^5$ .......................... B62D 1/06; B32B 3/00
[52] U.S. Cl. ..................... 74/558; 74/558.5; 263/263; 263/172
[58] Field of Search ............... 74/558, 558.5; 428/99, 428/100, 263, 172, 268

[56] References Cited

U.S. PATENT DOCUMENTS

| | | | |
|---|---|---|---|
| 1,446,628 | 2/1923 | Ridge | 74/558 |
| 2,078,059 | 4/1937 | Churchill | 74/558 |
| 2,121,963 | 7/1938 | Goit | 74/558 |
| 2,157,950 | 5/1939 | Best | 74/558 |
| 2,172,584 | 9/1939 | Iller | 74/558 |
| 2,226,866 | 12/1940 | Lipschultz | 74/558 |
| 2,309,374 | 1/1943 | Alexander | 74/558 |
| 2,491,803 | 12/1949 | De Heras et al. | 74/558 |
| 2,618,987 | 2/1950 | Goldstine | 74/558 |
| 3,489,031 | 1/1970 | Meier | 74/558 |
| 3,945,416 | 3/1976 | Rim | 74/558.5 |
| 4,009,735 | 3/1977 | Pinsky | 428/268 |
| 4,079,159 | 3/1978 | Sano et al. | 428/172 |
| 4,282,279 | 8/1981 | Strickland | 428/99 |
| 4,441,382 | 4/1984 | Snooks | 74/558 |

*Primary Examiner*—Richard Lorence
*Assistant Examiner*—Winnie Yip
*Attorney, Agent, or Firm*—Joseph W. Price

[57] ABSTRACT

An improved steering wheel cover of a resilient tubular member having an inner surface of a knurly configuration and an outer fabric covering is provided. A plurality of locking tab members can extend from either side of the edge of the inner surface to provide a complementary locking configuration. Preferably, the insulating characteristics of Neoprene are utilized for the resilient member.

2 Claims, 2 Drawing Sheets

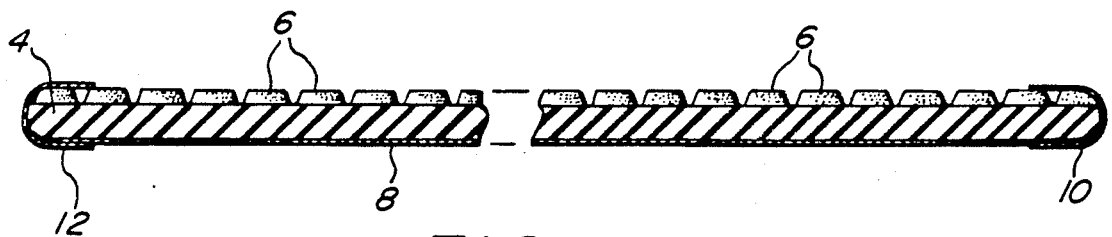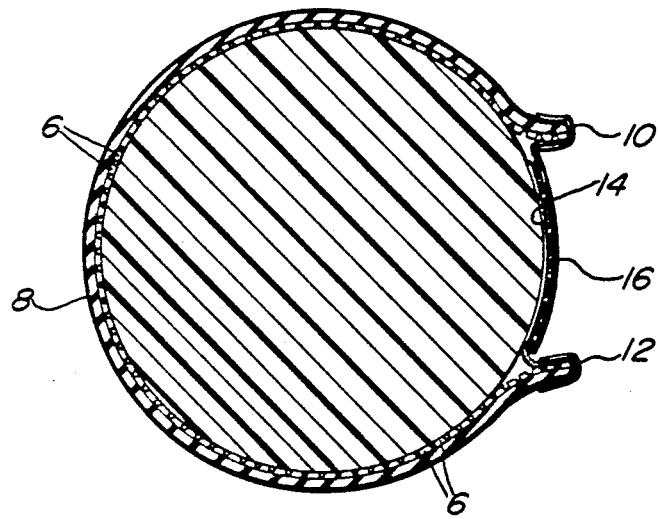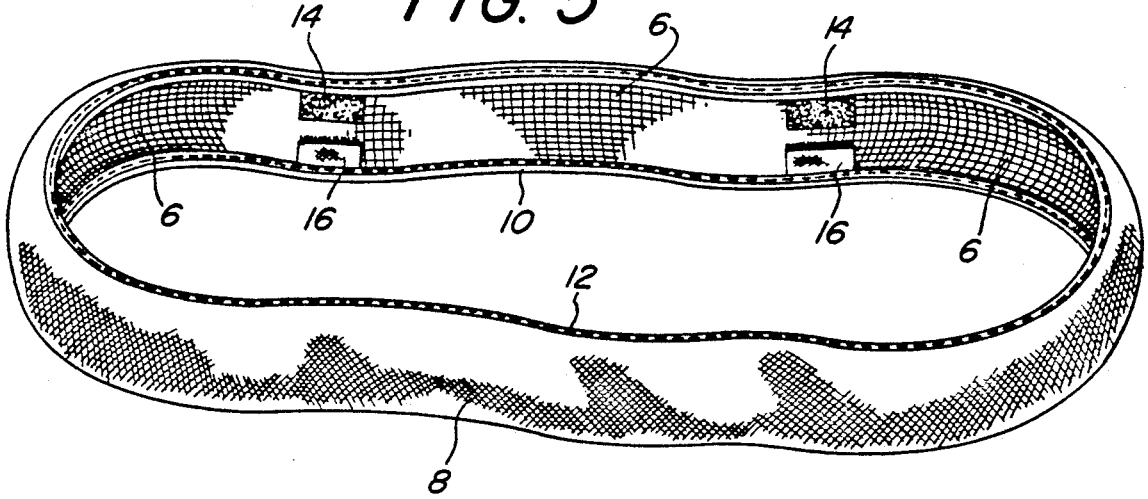

STEERING WHEEL COVER WITH A KNURLY CONFIGURED GRIPPING SURFACE

BACKGROUND OF THE INVENTION

1. Field of the Invention

This invention relates to a steering wheel cover and, more particularly, to a cover formed from an endless band of resilient material having a flexible outer fabric covering and a knurly inner surface configuration.

2. Description of Related Art

The desirability of providing steering wheel covers for automobiles, trucks and other vehicles is well known in the automotive field. Generally, the purpose of the steering wheel covers is to provide a pleasing tactile surface to improve the grip of the operator on the steering wheel, and also to insulate the operator's hands from both cold and heat. As can be readily appreciated, the aesthetics of the steering wheel cover is also important.

An example of a prior art steering wheel cover is a wrap or elongated strip of either vinyl or leather that is helically wound around the circumference of the steering wheel and maintained in position by stitching and/or wrapping cords. Another example of a steering wheel cover is a molded tubular member usually formed of resilient or semirigid rubber that may have fabric attached to the outer surface, such as disclosed in U.S. Pat. No. 4,441,382 and U.S. Pat. No. 1,446,628. Various forms of fabric steering wheel covers comprising both rubberized fabric and plastic have been suggested, such as in U.S. Pat. No. 2,226,866, U.S. Pat. No. 2,078,059, U.S. Pat. No. 2,157,950, and U.S. Pat. No. 2,491,803. The steering wheel covers of U.S. Pat. No. 2,172,584 and U.S. Pat. No. 3,945,416 are cited of general background interest.

As can be readily appreciated, there have been numerous attempts to provide various forms of steering wheel covers that can be economically purchased by the public. There is frequently a trade-off in the advantages between the ease of mounting of the steering wheel cover and the safety requirements of ensuring a nonslipping configuration when in place. There is still a demand in the prior art to optimize the advantages of a steering wheel cover in an economical manner which is readily available to the public.

SUMMARY OF THE INVENTION

An improved steering wheel cover is provided that comprises a resilient tubular support member of a configuration smaller in diameter than the diameter of a steering wheel with an inner surface of a knurly configuration having a plurality of truncated protrusions extending from a layer of resilient material and spatially positioned in regularly-spaced intervals across the inner surface. The tubular member has an outer surface of a resilient fabric covering adhered to the outer layer of the resilient support material. The resilient material can advantageously be a Neoprene material with additional resilient peripheral strips attached to inner surface edges and of a dimension to cause the tubular member to assume a toroidal configuration when in an unrestrained state. Fasteners such as Velcro tabs can be mounted at regularly-spaced intervals around the tubular member to ensure a firm fastening to the steering wheel.

BRIEF DESCRIPTION OF THE DRAWINGS

The novel features that are considered characteristic of this invention are set forth with particularity in the appended claims. The invention itself, both as to its organization and method of application, as well as additional objects and advantages thereof, will best be understood from this following description when read in connection with the accompanying drawings, in which like reference numbers refer to like parts, and in which:

FIG. an 3 is an enlarged side partial cross-sectional view;

FIG. 4 is a schematic cross-sectional view of both the steering wheel cover and the steering wheel; and FIG. 5 is a perspective view of the steering wheel cover of the present invention.

DESCRIPTION OF THE PREFERRED EMBODIMENTS

The following description is provided to enable any person skilled in the automobile accessory field to make and use the invention, and sets forth the best modes contemplated by the inventor for carrying out his invention. Various modifications, however, will remain readily apparent to those skilled in the above art, since the generic principles of the present invention have been defined herein specifically to provide a relatively economical steering wheel cover.

Figure 1:
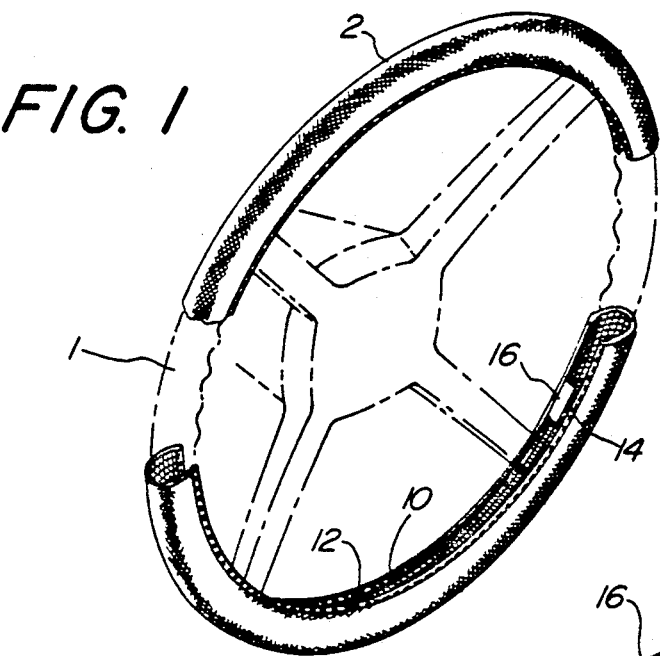
FIG. 1 is a perspective partial view of the steering wheel cover of the present invention mounted on a steering wheel.
Figure 2:
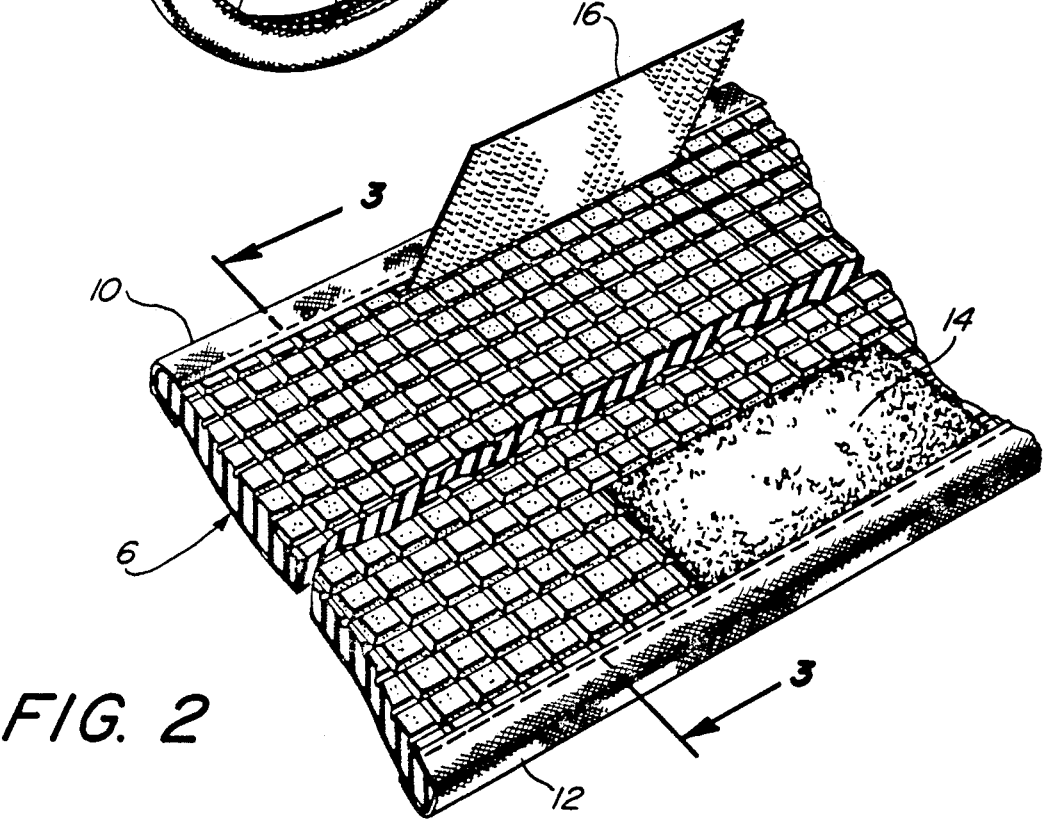
FIG. 2 is a partial enlarged sectional view of the inner gripping surface of the steering wheel cover.

Referring to FIG. 1, the steering wheel cover 2 of the present invention has a resilient tubular configuration with a diameter smaller than the diameter of the average steering wheel 1. As shown in FIG. 5, an endless, approximately thin flat band 4 of flexible resilient material, preferably Neoprene (polychloroprene), constitutes the base or the support material of the steering wheel cover. The inner surface of the resilient material has a specific gripping knurly configuration consisting of a plurality of truncated protrusions spatially positioned in regularly-spaced intervals across the inner surface of the steering wheel cover, as shown in FIGS. 2 and 3, which have been enlarged to illustrate the protrusions 6. The protrusions 6 assist in both gripping the outer circumference of the steering wheel as shown, for example, in FIG. 4 and in insulating the operator's hand from the temperature of the steering wheel 1. Adhering to the outer surface of the steering wheel cover 2 is a flexible fabric 8, for example, of nylon, which can optionally carry patterns or other decorative features if desired. The nylon also assists with absorption of any perspiration on the driver's hands.

A pair of peripheral resilient strips 10, 12 are attached to either side of the inner surface edge and are configured to be of a dimension to cause the flat band 4 to assume a toroidal configuration when unrestrained, such as shown in FIG. 5. These resilient strips can be formed, for example, of a Lycra material to ensure a snug mounting of the steering wheel cover 2 on the steering wheel 1.

Spaced at regular intervals along the inner surface of the steering wheel cover are a plurality of first locking tabs 14, and also a plurality of second complementary locking tab members 16. These locking tab members extend, when fastened together, across the inner surface to securely lock the steering wheel cover 2 on the steering wheel 1. Preferably, the locking tab members constitute, respectively, a nap material on one set of locking members 14, and a plurality of flexible hooks on the other locking members 16 to form a Velcro-type fastener.

The resilient Neoprene band 4 provides tangential forces to grasp the steering wheel 1 as a result of stretching the band 4 to accommodate the dimensions of the steering wheel 1. The locking tab members 14 and 16 stretch the base in traverse directions to the tangential forces and cause a multidimension application of forces to ensure a cooperative gripping action by the protrusions 6 on the inner surface.

As can be readily appreciated, the resilience of the Neoprene further permits a relative adjustment to accommodate the steering wheels of different manufacturers, while the nylon fabric provides a highly pleasing tactile touch to the operator. The resilient Neoprene band, along with the knurly configuration, not only ensures a nonslip adherence to the steering wheel, but further provides sufficient installation to lessen either the cold or hot extremes which can occur when the vehicle is left subject to environmental conditions.

The tubular member has a side wall thickness of approximately 2 millimeters and can be easily compacted for storage and point of sale packaging. As can be readily appreciated, an operator can easily assemble and quickly remove the steering wheel cover 2 of the present invention with a minimum of effort. There is no necessity to apply adhesives or fasteners or additional securement means as are commonly used with the wrap steering wheel cover configurations of the prior art.

The present invention provides a relatively economical steering wheel cover which is easily mounted to tightly conform to the steering wheel configuration. The inner surface of a knurly protrusion configuration not only assists in the insulating characteristics of the Neoprene band, but further ensures a firm grasping of the steering wheel to prevent any slippage for the driver.

As can be readily appreciated, the preferred embodiment is disclosed herein for purposes of illustration. Additional forms of material could be utilized without departing from the spirit of the present invention, and according the scope of the present invention should be measured solely from the following claims.

What is claimed is:

1. An improved steering wheel cover for a steering wheel comprising:

a resilient pliable tubular member having a configuration in a nonexpanded state smaller in diameter than the diameter of a steering wheel, the tubular member having an inner surface of a knurly configuration of regularly spaced, substantially flat, truncated solid projections for grasping the steering wheel to prevent relative slippage, the tubular member having an outer surface of a substantially flexible fabric covering, the fabric covering being adhered to a layer of resilient material that terminates in the knurly inner surface configuration;

a pair of peripheral resilient strips, one each attached to either side of an inner surface edge and of a dimension to cause the tubular member to assume a toroidal configuration with a spaced inner gap when in an expanded state, and means for securing the tubular member on the steering wheel including a plurality of first locking tab members of a nap material extending from one side across the inner surface and a plurality of second complementary locking tab members comprising a plurality of flexible hooks extending from the other side across the inner surface.

2. The steering wheel cover of claim 1 wherein the layer of resilient material is Neoprene.

* * * * *